March 29, 1960 R. W. DERRICK 2,930,343
LATHE LAYOUT DEGREE DEVICE
Filed Aug. 22, 1957 2 Sheets-Sheet 1
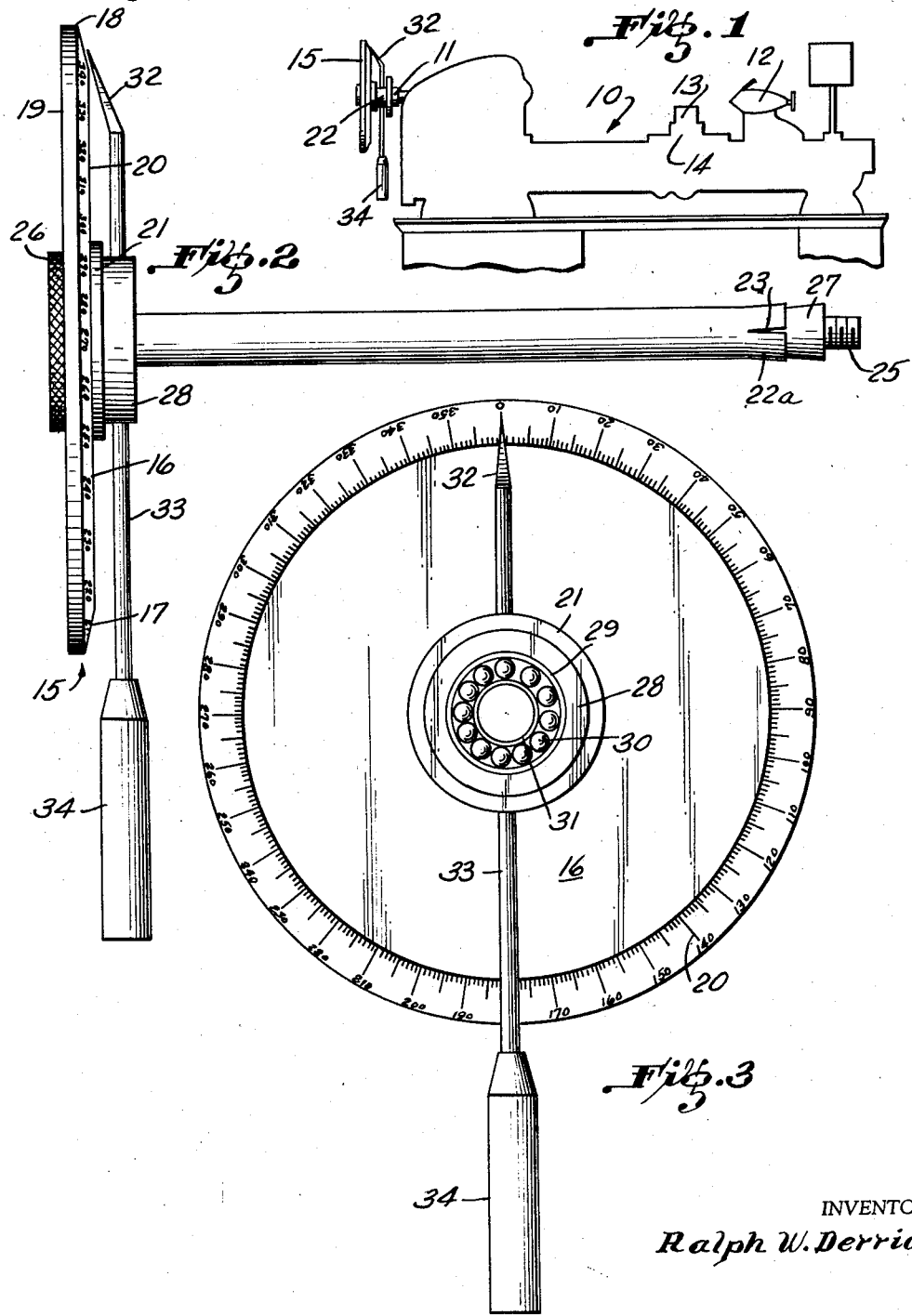
INVENTOR
Ralph W. Derrick
BY
Wilkinson, Mawhinney & Theibault
ATTORNEYS March 29, 1960  R. W. DERRICK  2,930,343
LATHE LAYOUT DEGREE DEVICE
Filed Aug. 22, 1957  2 Sheets-Sheet 2
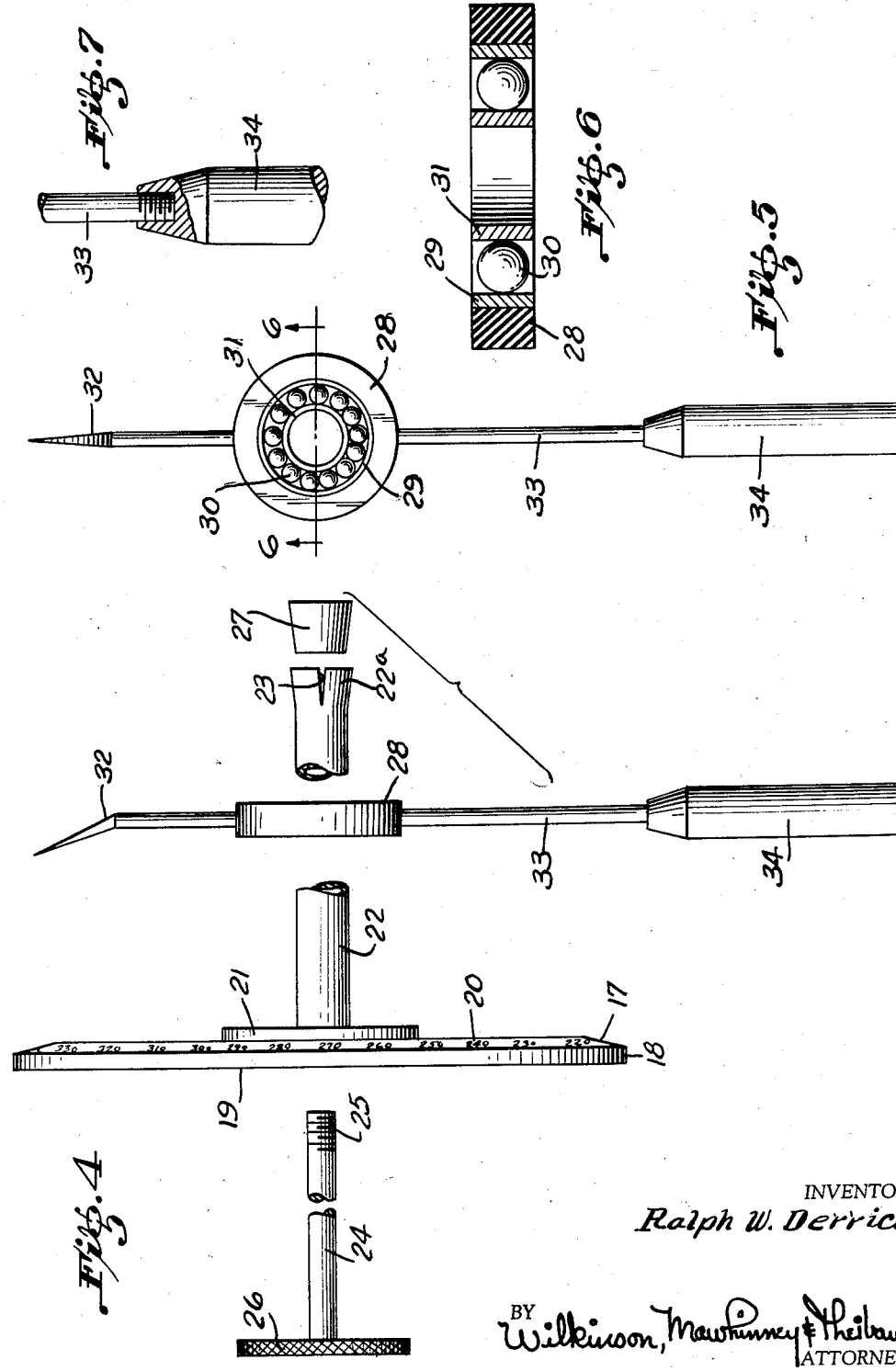
INVENTOR
Ralph W. Derrick
BY Wilkinson, Mawhinney & Theibault
ATTORNEYS

2,930,343

LATHE LAYOUT DEGREE DEVICE

Ralph W. Derrick, Picture Rocks, Pa.

Application August 22, 1957, Serial No. 679,736

2 Claims. (Cl. 116—115.5)

The present invention relates to a lathe layout degree device and has for an object to provide an attachment for presently existing lathes for the purpose of doing degree and angle layout work on lathes not equipped with built-in dividing heads, and eliminating the necessity of removing work from the lathe and setting up a milling machine.

Another object of the present invention is to provide a device which may be quickly attached to a lathe and quickly removed therefrom not requiring a disassembly of the lathe.

A further object of the present invention is the provision of a lathe layout attachment economical in construction and having extreme ease in application requiring a minimum of parts and which may be quickly installed even by amateurs for basement work shops.

A still further object of the present invention is the provision of a device which permits work to be placed in a lathe work chuck with a scale secured to the lathe spindle and an index pointer having a pendulous weight mass at the end opposite the pointer riding freely with the spindle shaft. The operator then places a center punch or scribe in the tool post on the compound rest of the lathe. The scale is rotated by the operator, the pointer remaining stationary until the desired degree of rotation is attained as indicated by the index pointer registering with the scale, at which time the center punch is tapped with a hammer marking the work.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a diagrammatic view of a conventional lathe with the device of the present invention thereon;

Figure 2 is a side elevational view of a device constructed in accordance with the present invention;

Figure 3 is an end elevational view of the device of Figure 2 taken from the righthand end thereof;

Figure 4 is an exploded side elevational view of the device of Figures 2 and 3;

Figure 5 is an end elevational view of the index member of the present invention;

Figure 6 is a vertical section taken on the line 6—6 in Figure 5 at an enlarged scale, and Figure 7 is a fragmentary end elevational view taken at an enlarged scale of the pendulous weight showing its attachment to the index member.

Referring now to the drawings, 10 designates a conventional lathe having a head or chuck spindle 11. The lathe also has a tail stock or tail spindle 12 and a tool post 13 carried by a compound rest 14. The lathe head or chuck spindle 11 is bored out or hollow at its lefthand end and will receive the device of the present invention therein.

The device comprises a scale member 15 in the form illustrated; it is a disc having a face 16, a chamfered wall 17 and a peripheral wall 18 normal to the back wall 19. The chamfered wall 17 contains a scale 20 thereon graduated into the 360° of a full circle.

Secured to the front or face 16 of the scale member 15 is a flange 21 of a lathe spindle attaching shaft 22 which is of a diameter to be snugly received within the lefthand hollow bore of the lathe head spindle 11. This flange 21 may be anchored to the face 16 of the scale member 15 by any suitable means so that it, the shaft 22, will rotate upon rotation of the scale member. The shaft 22 is hollow and is split at its lathe receiving end as at 23. The scale member 15 has an opening therethrough as does the flange 21 to receive a shaft 24 threaded at one end at 25 and carrying a knurled operating disc 26 at the other end secured thereto for compelling rotation thereof.

Carried on the threaded end 25 of shaft 24 is a frustoconical wedge member 27 having complemental threads mating with the threads 25 whereby upon rotation of the shaft 24 the wedge 27 will be drawn against the split end of the shaft 22, forcing portions 22$^a$ of the shaft 22 radially outwardly.

The index member consists in the form illustrated of a collar member 28 secured to the outer race 29 of antifriction ball bearing mounting also including balls 30 and an inner race 31. This inner race 31 is snugly slid over the shaft 22 and force fit therewith. Secured to the collar 28 is a pointer 32 diametrically opposed to which is a dowel 33, one end of which is secured to the collar 28 and the other end of which has secured thereto a balance weight or pendulous mass 34. The connection between the dowel 33, collar 28, and pendulous mass 34 may be screw threaded as shown at 35 in Figure 7. This screw threaded connection may also secure the pointer or index member 32 to the collar 28.

Operation

When it is desired to employ the device of the present invention on a lathe or other machine having a rotatable work holder, the driving means of the lathe is disengaged so that the head or chuck spindle 11 is freely rotatable. This invention is a layout device and is not employed when the chuck spindle is driven by the lathe motor.

The unit is placed upon the lathe by entering the split end of shaft 22 of the device (Figure 2) into the hollow bore of the lathe spindle until the device is in the position shown in Figure 1. The knurled disc 26 is then rotated to draw the conical wedge 27 axially toward the scale member 15 which causes the wedge 27 to force the segments 22$^a$ at the split end of the shaft 22 into frictional binding engagement with the inner wall of the bore of the lathe spindle.

The pendulous weight mass 34 will cause the pointer 32 to assume a plumb attitude through the antifriction bearing mounting on shaft 22.

The lathe operator then places a center pin or punch in the tool post 13 on the compound rest at a point along the axis of the work piece locked in the jaws of the lathe chuck.

The operator then grasps the scale member rotating it to a zero position reading with the pointer, as shown in Figure 3, at which time he strikes the center pin (not shown) with a hammer to mark the work piece to be laid out. If at this same point along the longitudinal axis of the work piece a series of holes are to be drilled every 30° apart, the scale member 15 is rotated until the pointer 32 in its plumb attitude points to 30° and the center pin is again tapped marking the work piece. This is continued every 30° until the series is completed. Innumerous variations in layout work may be attained with the device herein illustrated.

The expensive dividing heads have been eliminated as has the necessity of removing work from the lathe and setting up a milling machine.

The cooperation between the scale member 15 and the index member or pointer 32 is a visual comparison and work can be checked with the rotation of the scale member 15.

Although I have disclosed herein the best form of the invention known to me at this time, I reserve the right to all such modifications and changes as may come within the scope of the following claims.

1. A lathe layout degree attachment for use with the head spindle of a lathe having a bore formed therein, a substantially hollow tubular shaft having an inner and an outer end, a rotational degree scale disc member secured to the outer end of said shaft and having the degree portions of a complete circle marked thereon, the inner end of said shaft being received within said bore and having a split end detachably coupling said attachment to the head spindle of said lathe, a pendulous index member freely mounted on said shaft adjacent said scale member whereby rotation of said shaft and scale member with said head spindle will cause said pendulous index member to indicate the degree of rotation of said shaft and head spindle, and locking means comprising a shaft having an operating disc secured to one end and having the other end threaded to receive a tapered nut engageable with the split end of the tubular shaft to expand said tubular shaft into frictional engagement with the inner bore of the lathe spindle.

2. A lathe layout degree attachment as claimed in claim 1 wherein said pendulous index member comprises a ball bearing assembly the inner race of which rides upon said tubular shaft, a long arm secured at one end to the outer race of said ball bearing assembly and having a weight mass at its other end, and a pointer secured to the outer race of said ball bearing assembly at a point along said outer race diametrically disposed from said long arm.

References Cited in the file of this patent
UNITED STATES PATENTS

| | | |
|---|---|---|
| 2,438,229 | Price | Mar. 23, 1948 |
| 2,700,912 | Hardy | Feb. 1, 1955 |
| 2,753,834 | Bourguignon | July 10, 1956 |
| 2,777,417 | Domin | Jan. 15, 1957 |
| 2,803,881 | Baker | Aug. 27, 1957 |
| 2,805,636 | Smith | Sept. 10, 1957 |

OTHER REFERENCES

South Bend Lathe Works (Anniversary Catalog), International edition, copyrighted 1955.